United States Patent [19]
Kim

[11] Patent Number: 5,709,348
[45] Date of Patent: Jan. 20, 1998

[54] TAPE TENSION ADJUSTING DEVICE FOR USE IN A VIDEO CASSETTE RECORDER

[75] Inventor: Tae-Woo Kim, Seoul, Rep. of Korea

[73] Assignee: Daewoo Electronics Co., Ltd., Seoul, Rep. of Korea

[21] Appl. No.: 773,289

[22] Filed: Dec. 23, 1996

[30] Foreign Application Priority Data

Dec. 26, 1995 [KR] Rep. of Korea ............... 95-56874

[51] Int. Cl.⁶ .................... B65H 59/38; G11B 15/46; G11B 23/42
[52] U.S. Cl. .................... 242/334.6; 242/421.8; 360/85; 360/95
[58] Field of Search .................. 242/334.6, 421.8; 360/85, 95

[56] References Cited

U.S. PATENT DOCUMENTS

| | | | |
|---|---|---|---|
| 5,167,380 | 12/1992 | Choi | 242/334.6 |
| 5,445,337 | 8/1995 | Kwon | 242/334.6 |

FOREIGN PATENT DOCUMENTS 0613131  8/1994  European Pat. Off.

Primary Examiner—John Q. Nguyen
Attorney, Agent, or Firm—Pennie and Edmonds, LLP

[57] ABSTRACT

A tape tension adjusting device having a simplified structure for use in a video cassette recorder. The tape tension adjusting device comprises a tension lever rotatably fixed on a deck through a hinge pin, an upper and a lower band brake holders holding both ends of a band brake, respectively, and a spring for biasing the tension lever to allow the tension pole to exert a pressing force on a magnetic tape. The tension lever is provided with a tension pole at one end and a stepped boss disposed between the tension pole and the hinge pin. The upper and the lower band brake holders are rotatably fitted on an upper and a lower portions of the boss of the tension lever, respectively, in such a way that the band brake is partially wrapped around a supply reel table.

8 Claims, 4 Drawing Sheets

TAPE TENSION ADJUSTING DEVICE FOR USE IN A VIDEO CASSETTE RECORDER

FIELD OF THE INVENTION

The present invention relates to a video cassette recorder (VCR); and, more particularly, to a tape tension adjusting device, for use therein, having a simplified structure.

BACKGROUND OF THE INVENTION

In general, upon a recording or reproducing mode of the VCR, a magnetic tape travels along a given path and comes in contact with a head drum, while a pair of heads of the head drum records signals on the tape or reproduces signals recorded thereon. However, if the tape tension is not kept constant, it may cause the tape to be in a poor contact with the heads, producing a noise during, e.g., the reproducing mode. A tape tension adjusting device for keeping the tape tension constant has, therefore, been provided in the VCR.

In FIG. 1, there is presented a top view of a conventional tape tension adjusting device for use in a VCR. The tape tension adjusting device includes a tension lever 10, a first band brake holder 50, a second band brake holder 60 and a band brake 22.

The tension lever 10 is rotatably mounted to a deck 1 through a hinge pin 16, and a tension pole 12 is secured on one end of the tension lever 10. The tension lever 10 is biased by a spring 14 fixed at both ends to the other end of the tension lever 10 and to a protuberance 2 on the deck 1, respectively, thereby allowing the tension pole 12 to exert a pressing force on the tape to thereby keep the tape tensioned during, e.g., the recording or reproducing mode. The tension lever 10 is provided with a boss 30 between the tension pole 12 and the hinge pin 16. The first band brake holder 50 holding one end of the band brake 22 is rotatably fastened on the boss 30, and the second band brake holder 60 holding the other end of the band brake 22 is mounted on a separate post (not shown) fixed on the deck 1 at a distant from the boss 30 in such a way that the band brake 22 is partially wrapped around a supply reel table 25. In order to prevent the second band brake 22 from deviating from the post, a cap 75 is fixed on top of the post.

In such a convetional tape tension adjusting device, the braking force of the band brake 22 is varied depending on the rotation of the tension lever 10. In other words, if the tape tension is increased, the tension lever is rotated clockwise and the braking force is reduced and vice versa, thereby keeping the tape tension constant.

However, since the conventional tape tension adjusting device contains a number of components, the structure thereof is complicated, resulting in the increased production cost thereof.

SUMMARY OF THE INVENTION

It is, therefore, a primary object of the present invention to provide a tape tension adjusting device with a simplified structure.

In accordance with one aspect of the present invention, there is provided a tape tension adjusting device for use in a video cassette recorder, which comprises: a tension lever rotatably fixed on a deck through a hinge pin, the tension lever being provided with a tension pole at one end and a boss disposed between the tension pole and the hinge pin; an upper and a lower band brake holders holding both ends of a band brake, respectively, the upper and the lower band brake holders being rotatably fitted on the boss of the tension lever in such a way that the band brake is partially wrapped around a supply reel table; and means for biasing the tension lever to allow the tension pole to press a magnetic tape.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 2:
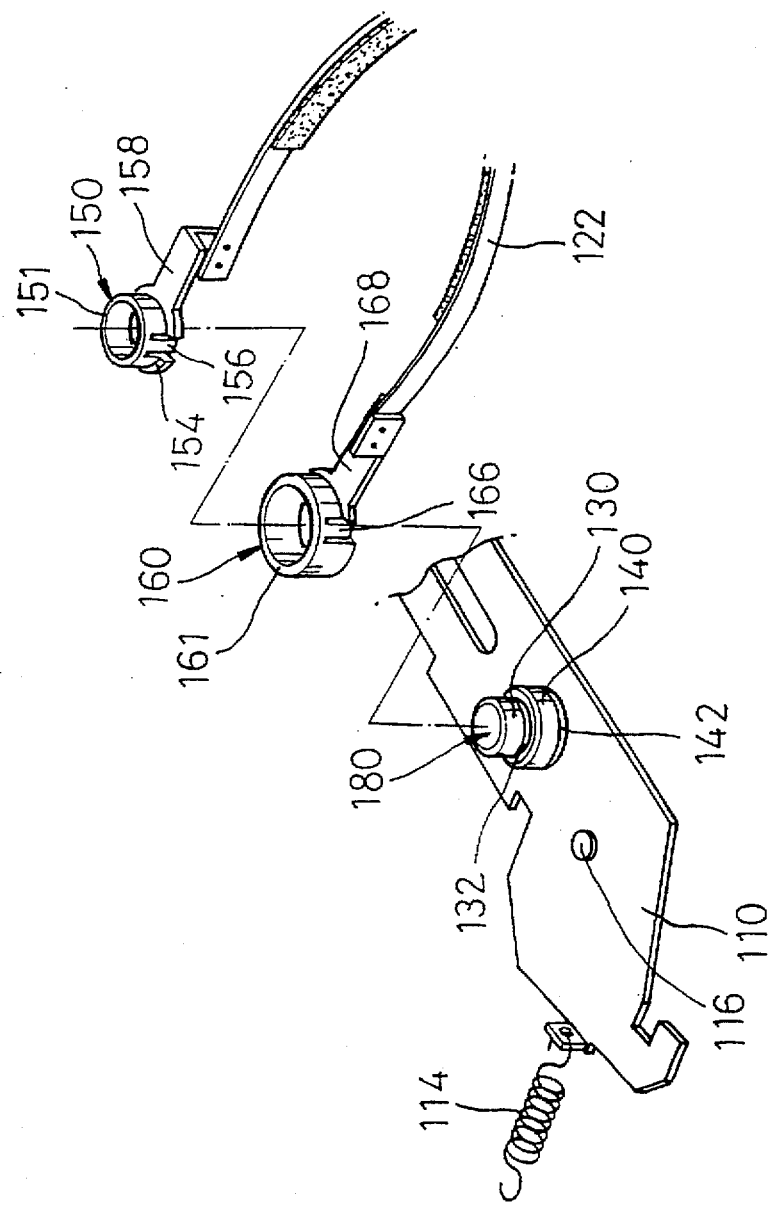
FIG. 2 presents an exploded perspective view of a tape tension adjusting device for use in a VCR in accordance with a preferred embodiment of the present invention.
Figure 3:
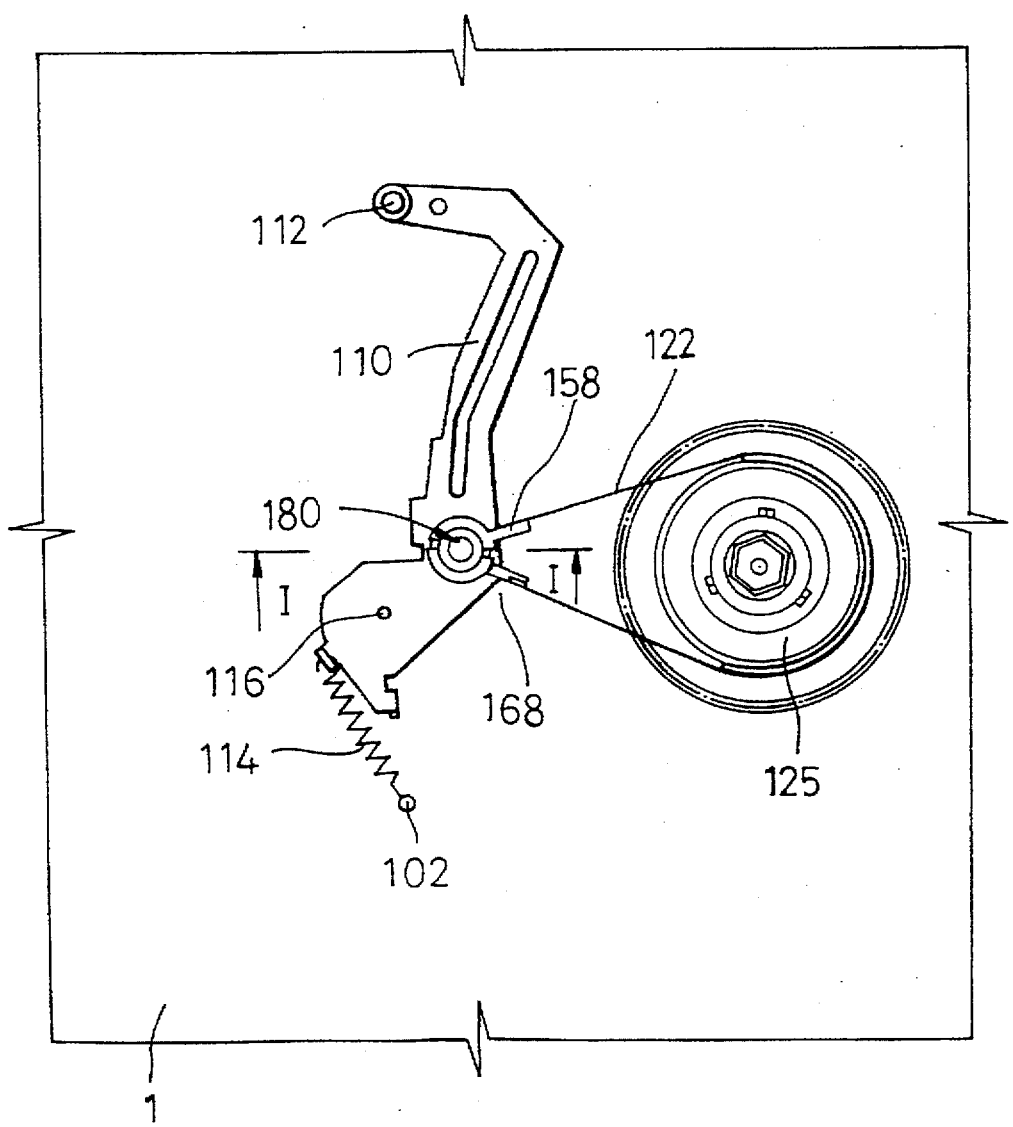
FIG. 3 represents a top view of the tape tension adjusting device of the present invention.
Figure 4:
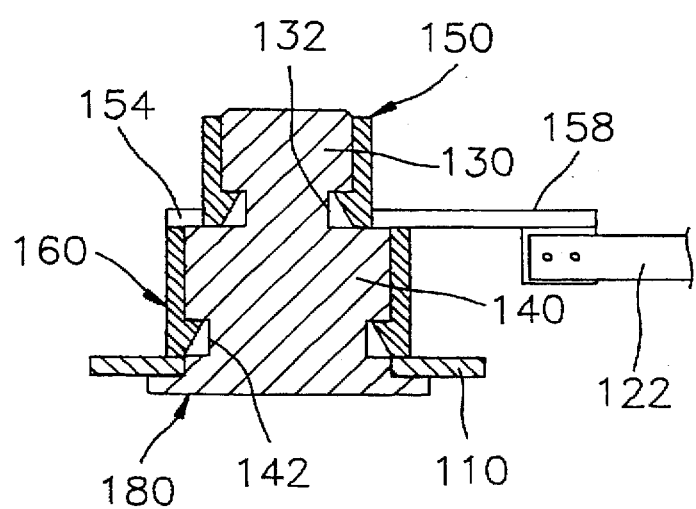
FIG. 4 sets forth a cross sectional view taken along the line I—I in FIG. 3.

There are provided in FIGS. 2 to 4 various views of a tape tension adjusting device for use in a VCR in accordance with a preferred embodiment of the present invention, respectively.

The tape tension adjusting device of the present invention includes a tension lever 110, an upper and a lower band brake holder 150, 160 and a band brake 122.

The tension lever 110 is rotatably mounted on a deck 101 through a hinge pin 116, and a tension pole 112 is secured on one end of the tension lever 110. The tension lever 110 is provided with a stepped cylindrical boss 180 having an upper and a lower portion 130, 140, the stepped boss 180 being disposed between the tension pole 112 and the hinge pin 116. The upper and the lower portions 130, 140 of the boss 180 are provided with upper and lower circumferential grooves 132, 142, respectively.

The upper band brake holder 150 has an upper ring-shaped portion 151 which is adapted to fit onto the upper portion 130 of the boss 180 and an upper band brake holding portion 158 to which one end of the band brake 122 is fixed. The upper ring-shaped portion 151 is provided with a pair of elastic hooks 156. The lower band brake holder 160 has a lower ring-shaped portion 161 which is adapted to fit onto the lower portion 140 of the boss 180 and a lower band brake holding portion 168 to which the other end of the band brake 122 is fixed. The upper ring-shaped portion 151 is provided with a pair of elastic retainers 166. The upper and the lower ring-shaped portions 152, 162 are rotatably fitted on the upper and the lower portions 130, 140 of the boss 180, respectively, in such a way that the band brake 122 is partially wrapped around a supply reel table 125, wherein the hooks 156 and retainers 166 are snapped in and movable along the upper and the lower circumferential grooves 132, 142, respectively. The upper band brake holding portion 158 of the upper band brake holder 150 is outwardly and downwardly extended from the upper ring-shaped portion 151, and the lower band brake holding portion 168 of the lower band brake holder 160 is outwardly and upwardly extended from the lower ring-shaped portion 161 so that both ends of the band brake 122 are held in a horizontal plane.

By a spring 114 fixed at both ends to the other end of the tension lever 110 and to a protuberance 102 on the deck 101, respectively, the tension lever 110 is biased to allow the tension pole 112 to exert a pressing force on a magnet tape (not shown), thereby keeping the tape tensioned during, e.g., a recording or reproducing mode of the VCR.

The braking force of the band brake 122 is varied depending on the rotation of the tension lever 110, thereby keeping the tape tension constant. More specifically, if, during the recording or reproducing mode, the tape running speed on the side of a take-up reel table (not shown) is faster than on the side of the supply reel table 125 and the tape tension on the side of the supply reel table 125 is increased, the tension lever 110 is rotated clockwise, or toward the supply reel table 125 so that the braking force is reduced, thereby keeping the tape tension constant. On the other hand, if the tape running speed on the side of a take-up reel (not shown) is slower than on the side of a supply reel table 125 and the tape tension on the side of the supply reel table 125 is decreased, the tension lever 110 is rotated counterclockwise, or away from the supply reel table 125 so that the braking force is increased, thereby keeping the tape tension constant.

On the other hand, the upper band brake holder 150 may have a flange 154 at bottom edge to prevent the lower band brake holder 160 from deviating from the boss 180 if the lower band brake holder 160 has no retainer 166.

Figure 1:
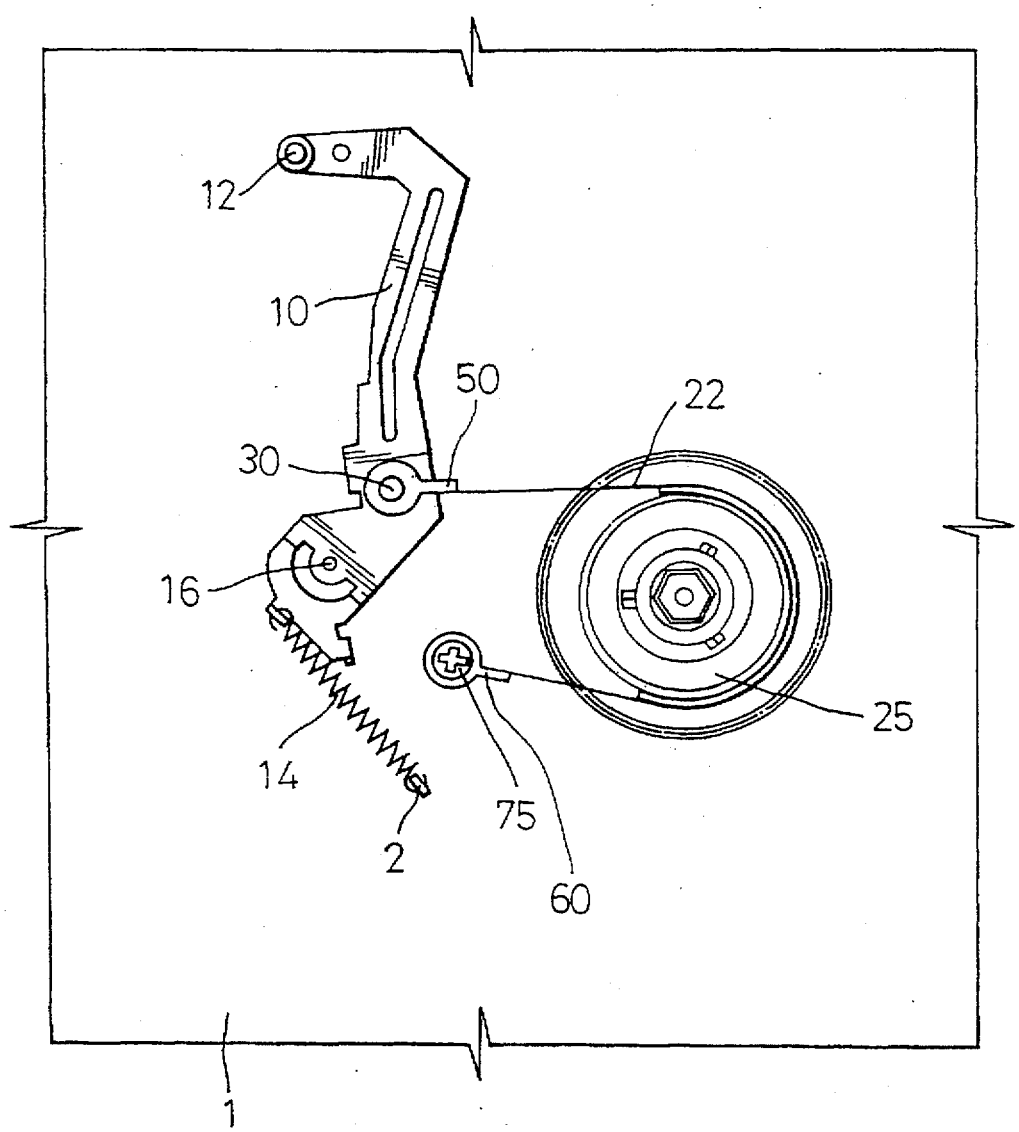
FIG. 1 provides a top view of a conventional tape tension adjusting device for use in a VCR.

According to the tape tension adjusting device of the present invention, since both of the band brake holders 150, 160 are fitted on the stepped boss 180, the post and the cap 75 of the prior art device (see FIG. 1) can be eliminated, thereby simplifying the structure thereof.

While the present invention has been described with respect to certain preferred embodiments only, other modifications and variations may be made without departing from the scope of the present invention as set forth in the following claims.

What is claimed is:

1. A tape tension adjusting device for use in a video cassette recorder, which comprises:

a tension lever rotatably fixed to a deck through a hinge pin, the tension lever being provided with a tension pole at one end and a boss disposed between the tension pole and the hinge pin;

an upper and a lower band brake holders holding both ends of a band brake, respectively, the upper and the lower band brake holders being rotatably fitted on the boss of the tension lever in such a way that the band brake is partially wrapped around a supply reel table; and means for biasing the tension lever to allow the tension pole to exert a pressing force on a magnetic tape.

2. The device of claim 1, wherein the boss of the tension lever is of a stepped shape having an upper and a lower portions; the upper band brake holder has an upper ring-shaped portion rotatably fitted on the upper portion of the boss and an upper band brake holding portion connected to the upper ring-shaped portion; the lower band brake holder has a lower ring-shaped portion rotatably fitted on the lower portion of the boss and a lower band brake holding portion connected to the lower ring-shaped portion; and the band brake is fixed at both ends to the upper and the lower band brake holding portions, respectively.

3. The device of claim 2, wherein the upper portion of the boss is provided with an upper circumferential groove and the upper ring-shaped portion of the upper band brake holder is provided with at least one hook snapped in and movable along the groove of the upper portion of the boss.

4. The device of claim 3, wherein the upper ring-shaped portion is further provided with a flange at the bottom edge thereof to prevent the lower band brake holder from deviating from the boss.

5. The device of claim 3, wherein the lower portion of the boss is provided with a lower circumferential groove and the lower ring-shaped portion of the lower band brake holder is provided with at least one retainer snapped in and movable along the groove of the lower portion of the boss.

6. The device of claim 2, wherein the upper band band brake holding portion is outwardly and downwardly extended from the upper ring-shaped portion and the lower band brake holding portion is outwardly and upwardly extended from the lower ring-shaped portion so that both ends of the band brake is held in a horizontal plane.

7. A video cassette recorder comprising a tape tension adjusting device including a tension lever provided with a tension pole at one end and hinged on a deck, means for biasing the tension lever to allow the tension pole to press a magnetic tape, and a first and a second band brake holders holding both ends of a band brake, respectively, characterized in that:

the tension lever is further provided with a stepped boss between the tension pole and the hinged point; and the first and the second band brake holders are rotatably fitted on an upper and a lower portions of the boss of the tension lever, respectively, in such a way that the band brake is partially wrapped around a supply reel table.

8. The recorder of claim 7, wherein the upper and the lower portions of the boss are provided with an upper and a lower circumferential grooves, respectively; the first band brake holder has an upper ring-shaped portion rotatably fitted on the upper portion of the boss and an upper band brake holding portion connected to the upper ring-shaped portion; the second band brake holder has a lower ring-shaped portion rotatably fitted on the lower portion of the boss and a lower band brake holding portion connected to the second ring-shaped portion; and the band brake is fixed at both ends to the upper and the lower band brake holding portions, respectively.

* * * * *